(12) United States Patent
Ong

(10) Patent No.: US 9,913,560 B2
(45) Date of Patent: Mar. 13, 2018

(54) PROTECTIVE GUARD

(76) Inventor: Rosalind Ong, Tustin, CA (US)

(*) Notice: Subject to any disclaimer, the term of this patent is extended or adjusted under 35 U.S.C. 154(b) by 867 days.

(21) Appl. No.: 13/279,272

(22) Filed: Oct. 22, 2011

(65) Prior Publication Data

US 2013/0098930 A1 Apr. 25, 2013

(51) Int. Cl.
A47J 45/10 (2006.01)
A47J 36/36 (2006.01)
A47J 36/04 (2006.01)
B65D 25/20 (2006.01)

(52) U.S. Cl.
CPC ............... *A47J 45/10* (2013.01); *A47J 36/04* (2013.01); *A47J 36/36* (2013.01); *B65D 25/20* (2013.01); *Y10T 29/49826* (2015.01)

(58) Field of Classification Search
CPC .. A47J 36/04; A47J 36/36; A47J 36/00; A47J 45/10
USPC .... 220/694, 716, 730, 732, 739, 573.1–575, 220/485–495
See application file for complete search history.

(56) References Cited

U.S. PATENT DOCUMENTS

| 2,833,245 | A | * | 5/1958 | Stephens | 119/311 |
| 4,337,752 | A |   | 7/1982 | Leounes |  |
| 4,880,130 | A | * | 11/1989 | Blake | 220/655 |
| 5,111,975 | A | * | 5/1992 | Roberts | 222/475.1 |
| 5,265,890 | A | * | 11/1993 | Balsells | 277/467 |
| 5,584,414 | A |   | 12/1996 | Neubeck |  |
| 6,429,408 | B2 | * | 8/2002 | Muskalla et al. | 219/429 |
| 7,475,787 | B2 | * | 1/2009 | Gruver et al. | 220/258.2 |
| 7,896,191 | B1 |   | 3/2011 | Fall et al. |  |
| 2004/0045446 | A1 |   | 3/2004 | Park |  |
| 2007/0053618 | A1 |   | 3/2007 | Schoening |  |
| 2008/0078824 | A1 | * | 4/2008 | Spriegel et al. | 229/403 |
| 2008/0099363 | A1 |   | 5/2008 | Orbach |  |
| 2009/0065307 | A1 | * | 3/2009 | Boyden et al. | 186/44 |
| 2011/0283509 | A1 | * | 11/2011 | Miller | A47J 45/10 29/428 |

* cited by examiner

Primary Examiner — Andrew T Kirsch
Assistant Examiner — Jennifer Castriotta
(74) Attorney, Agent, or Firm — John D. Tran

(57) ABSTRACT

A protective guard, which can prevent injuries from the perimeter of items which have been exposed to extreme and/or high temperatures, can include a one-piece body having an inside groove. The one piece body is configured to continuously contact an item and the one-piece body comprising of an elastomeric pliable material.

6 Claims, 5 Drawing Sheets

PROTECTIVE GUARD

BACKGROUND OF THE INVENTION (1) Field of the Invention

The field of the invention is related to protective guards. In particular, a protective guard used on the perimeter of items that are exposed to extreme and/or high temperatures which prevent injury from high temperatures and to preserve the integrity of the said items.

(2) Description of Related Art

In consumer and commercial applications, a variety of plates, dishes, trays, pots, pans and bake ware are used to cook and serve food every day. Because of the nature of cooking, many of these items are subjected to extreme and/or high temperatures, hot or cold, during the cooking process. In addition, it is common for plates and dishes to be heated or have the food cooked in and on the same plate or dish that the food will be consumed from in order to have the food retain heat longer, improving the enjoyment and/or quality of the food.

In view of the above exposure to kitchen and cook ware being exposed to extreme and/or high temperatures, it is quite common place for injuries to occur arising from the exposure of users to these types of items. For example, many people have experienced the pain of burning themselves as a result of accidentally touching a heated cookware or inadvertently touching a hot plate at a restaurant. Chefs and servers commonly burn themselves in kitchens as they work with and maneuver around cook ware that have been subjected to extreme and/or high temperatures. Children, often burn themselves accidentally when accidentally coming into contact with these extreme and/or high temperature based cookware. A majority of these injuries result from the user touching the rim, edge and/or perimeter of the items that have been exposed to extreme and/or high temperatures without proper protection.

Injuries caused by exposure to extreme and/or high temperature items are not limited to just kitchen and cook ware but can also be found in any scenario when the rim, edge or side of a surface area has been exposed to extreme and/or high temperature. For example, many people are the unfortunate victim of being burned by the edge, rim and/or perimeter of an iron or oven and baking racks that have been exposed when a user is attempting to remove a food item.

In attempting to protect users against injury resulting from exposure to items, especially edges, rims and sides of times, that have been exposed to extreme and/or high temperatures, many forms of gloves, mitts, and grippers/holders have been created to be worn or used when coming into contact with these items. However, these types of protection are not ideal because these protective items are often misplaced, lost, or forgotten to be worn. In addition, these solutions only provide temporary protection and do not address protecting against injury when these protective devices are not used or worn.

Thus, there is still a need for a device which provides a more permanent and easier solution to protect people from injuries resulting from items that have been exposed to extreme and/or high temperatures, including kitchen and cook ware items such as plates, dishes, pots, pans, trays and other surfaces such as oven/bake racks and irons.

SUMMARY OF THE INVENTION

In light of the above, the inventor has discovered a device and method that solves the issues addressed above. In these respects, the inventive subject matter provides a device and method in which a protective guard having elastomeric qualities which are resistant to extreme and/or high temperatures is provided. Within this application, "extreme and/or high temperatures" is a term of art defined broadly to include any temperature, hot or cold, that could be considered harmful and dangerous to touch. The protective guard comprises of a removable one-piece body made from an elastomeric pliable material that is resistant to extreme and/or high temperature.

Contemplated protective guard is flexible and has the qualities of a band that can be positioned on the perimeter of any item which has been exposed to extreme and/or high temperatures which protects against touch related injuries. Within this application, "perimeter" is a term of art defined broadly including but not limited to such things as edges, rims, ends, lips, trims, tips, borders, brims and similarly situated terms of art.

In a particularly preferred embodiment of the contemplated device, the protective guard can be customized to fit on the perimeter on any plates, dishes, bowls, cups, pots, pans, trays and other surfaces such as oven/bake racks and irons that are exposed to extreme and/or high temperatures. In another embodiment, the protective guard can be made to be a "one-size fits all" device which can universally fit a wide range of the above stated items.

In some preferred embodiments of the contemplated device, the protective guard can be made in a plethora of colors and sizes to allow the protective guard to be unassuming in nature and to appear more aesthetically pleasing.

All referenced patents, applications and literatures are incorporated herein by reference to their entirety. Furthermore, where a definition or use of a term in a reference, which is incorporated by reference herein, is inconsistent or contrary to the definition of that term provided herein, the definition of that term provided herein applies and the definition of the term in the reference does not apply. The inventive subject matter may seek to satisfy one or more of the above-mentioned desires. Although the preferred embodiment of the inventive subject matter may obviate one or more of the above-mentioned desires, it should be understood that some aspects of the inventive subject matter might not necessarily obviate them.

In these respects, a protective guard device and method to the preferred embodiment of the inventive subject matter substantially departs from the conventional concepts and designs of the prior art, and so doing provides a protective guard and method that are not anticipated, rendered obvious, suggested, or even implied by any of the prior art either alone or in combination thereof

DETAILED SUMMARY OF THE INVENTION

In view of the foregoing disadvantages inherent in the known types of prior art, the general purpose of the preferred embodiment of the inventive subject matter, which will be described subsequently in greater detail, is to provide a protective guard which prevents injuries from the perimeter of items which have been exposed to extreme and/or heat temperatures.

Another object of the preferred embodiment of the inventive subject matter is to provide a one-piece protective guard which is removable;

Another object of the preferred embodiment of the inventive subject matter is to provide a protective guard that is inexpensive to manufacture;

Another object of the preferred embodiment of the inventive subject matter is to provide a protective guard which is made from an elastomeric pliable material which is resistant to extreme and/or high temperatures;

Another object of the preferred embodiment of the inventive subject matter is to provide a protective guard that can be made in a variety of shapes and sizes;

Another object of the preferred embodiment of the inventive subject matter is to provide a protective guard that contains a groove which allows the protective guard to fit securely on the rim, edge and/or perimeter of kitchen and cook ware items such as plates, bowls, cups, dishes, trays, pots, pans;

Another object of the preferred embodiment of the inventive subject matter is to provide a "one-size fits all" protective guard which can be made in a way to universally adapt to fit a wide range of items mentioned above;

Another object of the preferred embodiment of the inventive subject matter is to provide a protective guard that can be made in a plethora of colors in order to be inconspicuous and more aesthetically pleasing.

Another object of the preferred embodiment of the inventive subject matter is to provide a protective guard that can also be placed on the perimeter such as oven/bake racks or irons which are also commonly subjected to extreme and/or high temperatures.

Another object of the preferred embodiment of the inventive subject matter is to provide a protective guard that is microwave safe.

Another object of the preferred embodiment of the inventive subject matter is to provide a protective guard that is to preserve the integrity of the perimeter of the items such as plates, bowls, cups, dishes, trays, pots, pans by preventing damage including but not limited to chipping and/or scratching of the said perimeter of items.

There has thus been outlined, rather broadly, the more important features of the present invention in order that the detailed description thereof may be better understood, and in order that the present contribution to the art may be better appreciated. There are additional features of the inventive subject matter that will be described hereinafter.

In this respect, before explaining at least one embodiment of the present invention in detail, it is to be understood that the invention is not limited in its application to the details of the construction and to the arrangements of the components set forth in the following description or illustrated in the drawings. The subject matter of the present invention is capable of other embodiments and of being practiced and carried out in various ways. Also, it is to be understood that the phraseology and terminology employed herein are for the purpose of the description and should not be regarded as limiting. To accomplish the above and related objects, this inventive subject matter may be embodied in the form illustrated in the accompanying drawings, attention being called to the fact, however, that the drawings are illustrative only, and that changes may be made in the specific construction illustrated.

BRIEF DESCRIPTION OF THE DRAWING(S)

Various other objects, features and attendant advantages of the preferred embodiment of the inventive subject matter will become fully appreciated as the same becomes better understood when considered in conjunction with the accompanying drawings, in which like reference characters designate the same or similar parts throughout the several views, and wherein.

DETAILED DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

Figure 1:
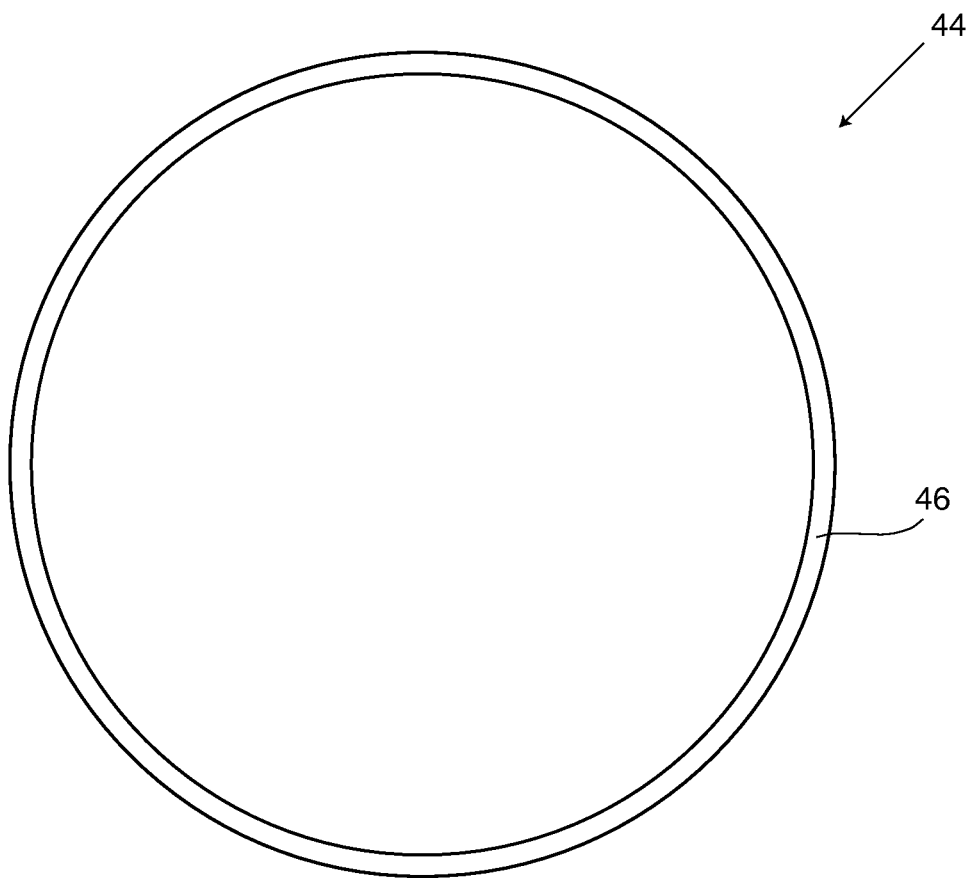
FIG. 1 is a top down view of a protective guard device according to an aspect of the inventive subject matter.
Figure 2:
FIG. 2 is a side view of a protective guard device according to an aspect of the inventive subject matter.
Figure 3:
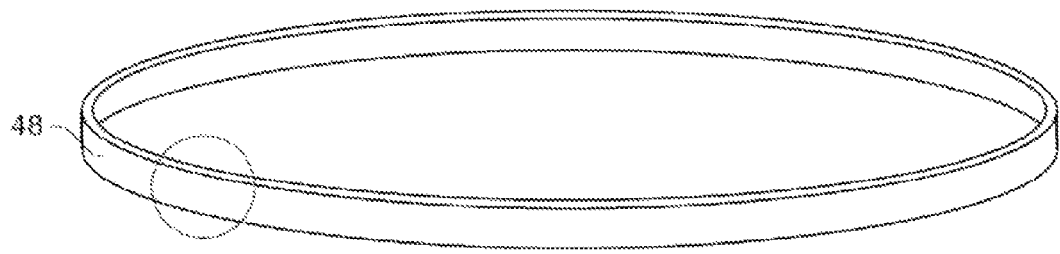
FIG. 3 is a side perspective view of a protective guard device according to an aspect of the inventive subject matter depicting the protective guard device as a one-size fits all band.
Figure 3A:
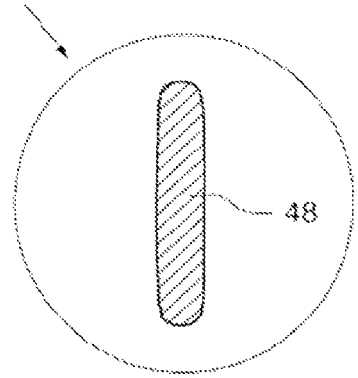
FIG. 3A is a cross-sectional view of one embodiment of the protective guard device according to an aspect of the inventive subject matter depicting the protective guard device as an one-size fits all band.
Figure 4:
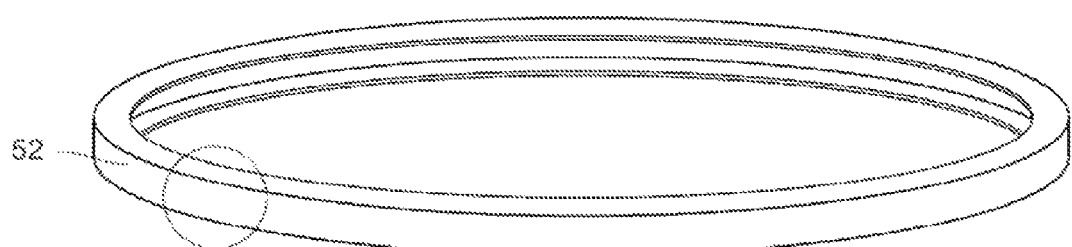
FIG. 4 is a side perspective view of a protective guard device according to an aspect of the inventive subject matter depicting the protective guard device comprising a groove which allows for a more customized fit.
Figure 4A:
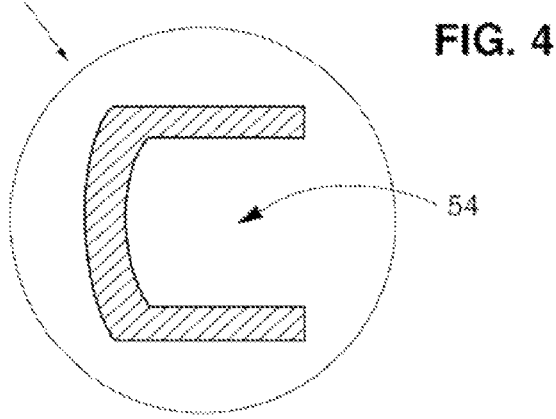
FIG. 4A is a cross-sectional view of one embodiment of the protective guard device according to an aspect of the inventive subject matter depicting the protective guard device comprising a groove which allows for a more customized fit.
Figure 5:
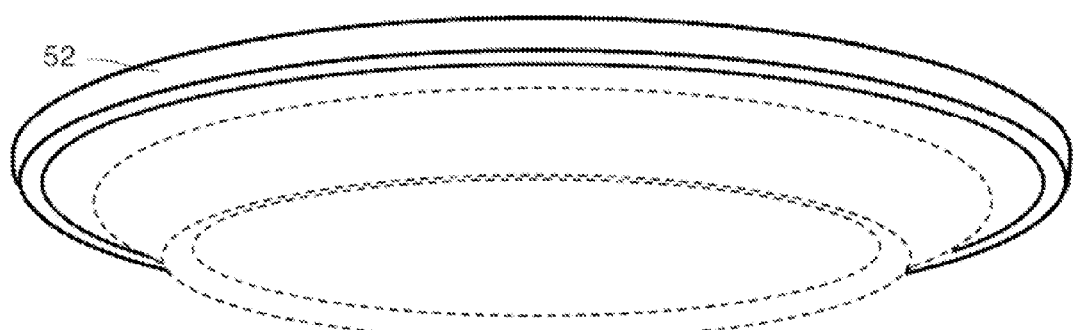
FIG. 5 is a bottom angled perspective view of a protective guard device according to an aspect of the inventive subject matter described in FIG. 4 being fitted on a dish.
Figure 6:
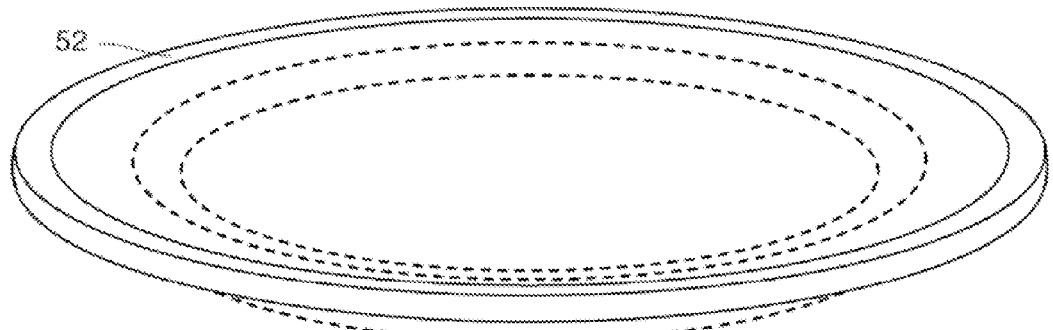
FIG. 6 is a top down angled perspective view of a protective guard device according to an aspect of the inventive subject matter described in FIG. 4 being fitted on a dish.

Referring now to the drawings, which are provided by way of illustration and example, and wherein like reference numerals designate like or corresponding elements among the several views, there is shown in FIG. 1 and FIG. 2, a removable protective guard device 44 comprising a once-piece body 46. The protective guard attaches to the perimeter of items that have been exposed to extreme and/or high temperatures which prevent potential injury caused by the touching of the said perimeter of said items. Such items can be anything including but not limited to plates, bowls, cups, dishes, pots, pans, trays, oven/bake racks and/or irons. The protective guard also serves an additional purpose which is to preserve the integrity of the perimeter of the above stated items by preventing unwanted chipping and/or scratching of said perimeter caused by daily use or storage. In one preferred embodiment, the one-piece body comprises of an elastomeric pliable material that is resistant to extreme and/or high temperatures. In one preferred embodiment shown in FIG. 3, the protective guard device can be made in a form resembling an elastic band 48. FIG. 3A shows a cross-sectional view of the elastic band 48 that can be made to be a one-size fits all type of protective guard device. Another preferred embodiment is shown in FIG. 4 which depicts a protective guard device 52 having an inside groove 54 which allows the protective guard device the ability to have a more customized fit on the above stated illustrated examples of items. FIGS. 5 and 6 show one contemplated embodiment of the protective guard device 52 according to the subject matter of the present invention being fitted on the perimeter of a plate as seen from a bottom perspective and top down perspective, respectively.

Figure 7:
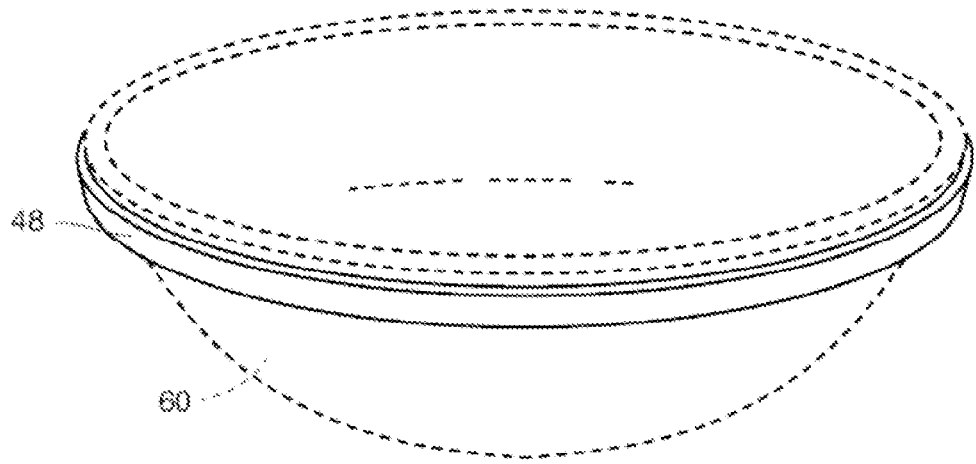
FIG. 7 is a side perspective view of a protective guard device according to an aspect of the inventive subject matter described in FIG. 3A being fitted on a bowl.
Figure 8:
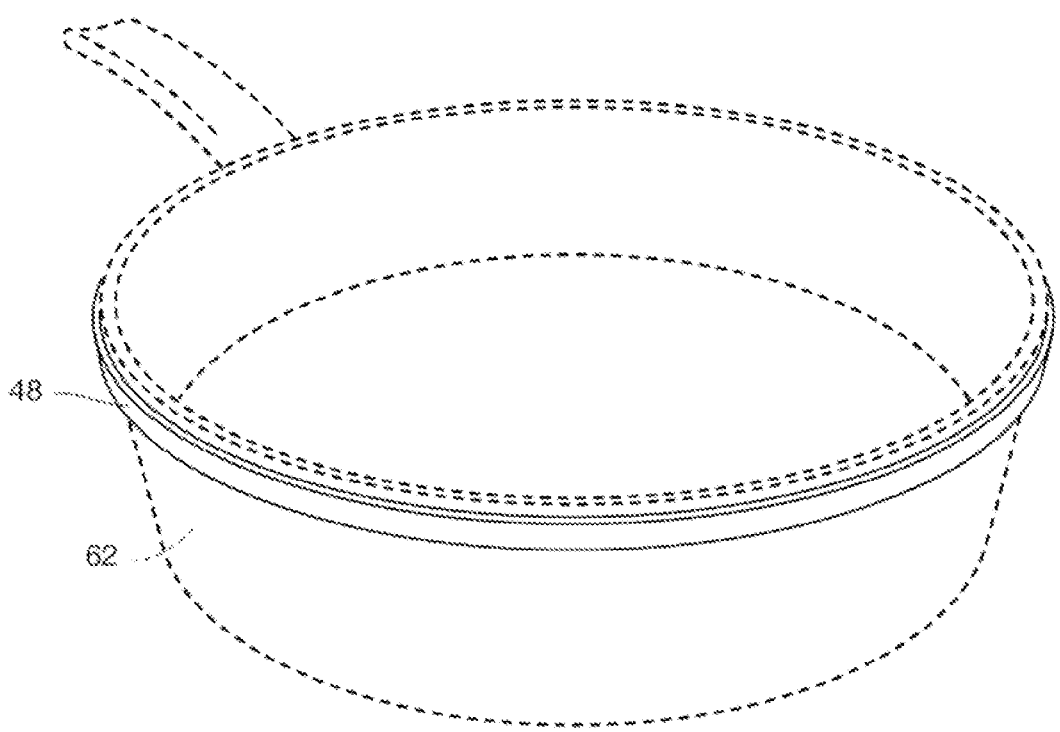
FIG. 8 is a side perspective view of a protective guard device according to an aspect of the inventive subject matter described in FIG. 3A being fitted on a pot.

FIG. 7 and FIG. 8 illustrate additional embodiments depicting the one-size fits all elastic band 48 being attached to the perimeter of a bowl 60 and a pot 62 respectively.

Figure 9:
FIG. 9 is a cross-sectional view of one embodiment of the protective guard device according to an aspect of the inventive subject matter described in FIG. 3 depicting the protective guard device as a one-size fits all band being fitted on a bowl.

Turning to FIG. 9, a contemplated embodiment according to the subject matter of the present invention shows a cross-sectional view of the one-size fits all protective guard 44 resembling an elastic band being attached to the perimeter of a bowl.

Figure 10:
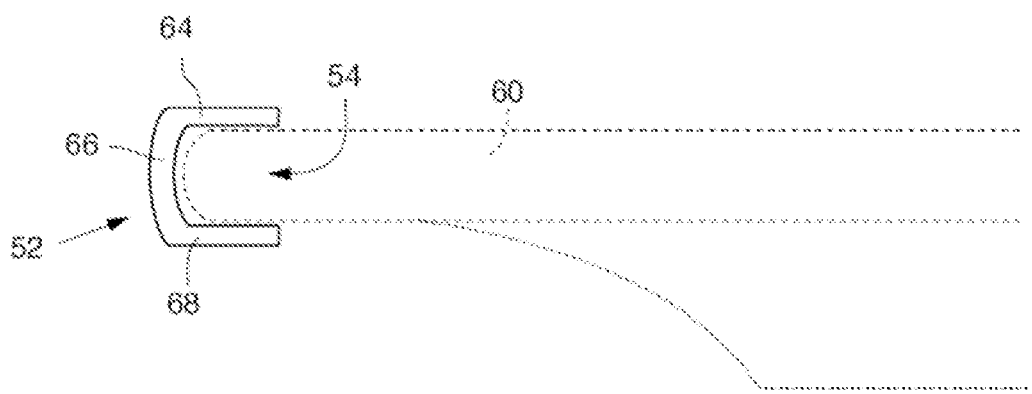
FIG. 10 is a cross-sectional view of one embodiment of the protective guard device according to an aspect of the inventive subject matter described in FIG. 4 depicting the protective guard device being fitted on a plate.

Illustrated in FIG. 10, a contemplated embodiment according to the subject matter of the present invention shows a cross-sectional view of the protective guard device 52 having a groove which allows the protective guard to have a more customized fit on the perimeter of a plate. The protective guard device 52 is depicted with the inside groove 54 having a top portion 64, a side portion 66 and a bottom portion 68. The top portion 64 and the bottom portion 68 are depicted as having substantially parallel planar surfaces extending from a distal tip of the top portion 64 and the bottom portion 68 while the side portion 66 is depicted extending between the top portion 64 and the bottom portion 68. The top portion 64, the bottom portion 68, and the side portion 66 are shown only partially contacting the rim of the bowl 60 while leaving part of the protective guard device 52 not in contact with the bowl 60 between the top portion 64 and the side portion 66 and between the bottom portion 68 and the side portion 66. That is, a first portion of a beveled edge of the bowl 60 is depicted spaced apart from the planar surface of the top portion 64 and the side portion 66, and a second portion of the beveled edge of the bowl 60 is depicted spaced apart from the planar surface of the bottom portion 68 and the side portion 66. The planar surfaces of the top portion 64 and the bottom portion 68 are depicted having continuous contact with the rim of the bowl 60 from the distal tip of the top portion 64 and the bottom portion 68 up to a beveled edge of the bowl 60. The planar surfaces of the top portion 64 and the bottom portion 68 extending from the distal tip of the top portion 64 and the bottom portion 68 are also depicted as the widest portion of the inside groove 54. For expository purposes, the term "distal tip" as used herein is expressly defined as the furthest point of an inner surface, of the inside groove 54 of the top portion 64 and the bottom portion 68, from the side portion 66 that is configured to contact the item.

Figure 11:
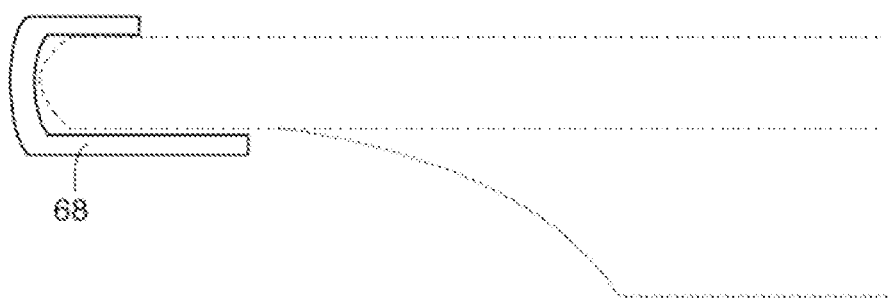
FIG. 11 is a cross-sectional view of one embodiment of the protective guard device according to an aspect of the inventive subject matter described in FIG. 4 depicting the protective guard device being fitted on a plate with an extended bottom to cover more of the bottom of the perimeter of the plate.

FIG. 11 illustrates the same contemplated embodiment shown in FIG. 10 having the bottom portion 68 of the protective guard that extends further along the bottom perimeter of the plate to allow more surface area protection for items with a more elongated perimeter.

Thus, specific embodiments and applications of the protective guard device have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method of preventing injuries related to the touching of a perimeter of an item that has been exposed to extreme and/or high temperatures, comprising:
   attaching a protective guard, having an inside groove with a first planar surface extending from a distal tip of a top portion toward a side portion and a second planar surface extending from a distal tip of a bottom portion toward the side portion, on the perimeter of said item that has been exposed to extreme and/or high temperatures; and
   providing said protective guard being comprised of an elastomeric pliable material that is resistant to said extreme and/or high temperatures; and
   wherein:
   said protective guard is configured to continuously contact the item with the first planar surface and second planar surface from the distal tip of the top portion and from the distal tip of the bottom portion up to a beveled edge of the item, a first portion of the beveled edge of the item spaced apart from the first planar surface and the side portion, a second portion of the beveled edge of the item spaced apart from the second planar surface and the side portion, and a third portion of the beveled edge of the item in contact with the side portion.

2. The method of claim 1 wherein said protective guard contains the inside groove to allow said protective guard to fit securely on the perimeter of said item exposed to extreme and/or high temperatures.

3. The method of claim 1 wherein said item exposed to extreme and/or high temperatures is selected from a group comprising plates, bowls, cups, dishes, pots, pans, trays, oven/bake racks, and irons.

4. The method of claim 1 wherein said protective guard resembles a band made of an elastomeric pliable material which allows the protective guard to fit on the perimeter of a variety of different shapes and sizes of said item that has been exposed to extreme and/or high temperatures.

5. The method of claim 1 wherein said protective guard can be manufactured in a variety of different colors, shapes and sizes.

6. The method of claim 1 wherein said protective guard preserves the integrity of the perimeter of said item exposed to extreme and/or high temperatures by protecting said perimeter from damage including chipping and/or scratching.

\* \* \* \* \*